No. 765,242. PATENTED JULY 19, 1904.
C. JOHNSON.
FEED TROUGH.
APPLICATION FILED JAN. 27, 1904.
NO MODEL.

WITNESSES:
D. E. Carlsen
E. C. Carlsen

INVENTOR.
Curtis Johnson.
BY his ATTORNEY
A. M. Carlsen.

No. 765,242.

Patented July 19, 1904.

UNITED STATES PATENT OFFICE.

CURTIS JOHNSON, OF RIVER FALLS, WISCONSIN.

FEED-TROUGH.

SPECIFICATION forming part of Letters Patent No. 765,242, dated July 19, 1904.

Application filed January 27, 1904. Serial No. 190,908. (No model.)

*To all whom it may concern:*

Be it known that I, CURTIS JOHNSON, a citizen of the United States, residing at River Falls, in the county of Pierce and State of Wisconsin, have invented certain new and useful Improvements in Feed-Troughs; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to feed-troughs for stock or various kinds of animals; but it is especially adapted to feeding hogs; and the main objects of the invention are, first, to provide the trough with a combined feed-guard and fender which may easily be changed from one side to the other of the trough; second, to make such fender adjustable for small and for big animals; third, to provide such fender with means for preventing the animals from fighting while being fed, although they are free to see each other; fourth, to prevent the animals from walking into the trough, which is a desire so great in many animals, especially hogs, that one or two animals are often found to occupy a longitudinal position in the feed-trough, and thereby hinder the other animals from feeding. These and other objects I attain by the novel construction and arrangement of parts illustrated in the accompanying drawings, in which—

Figure 1:
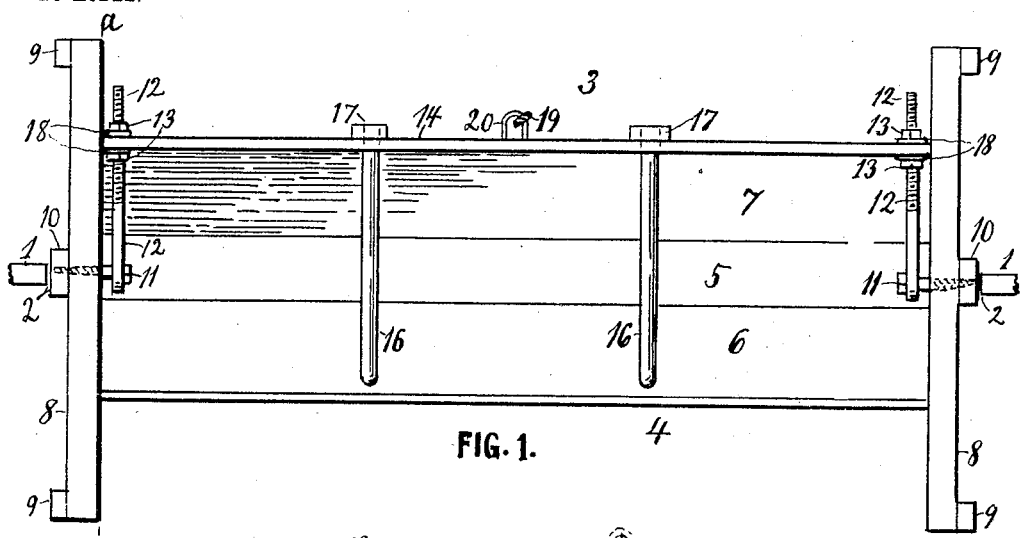
Figure 2:
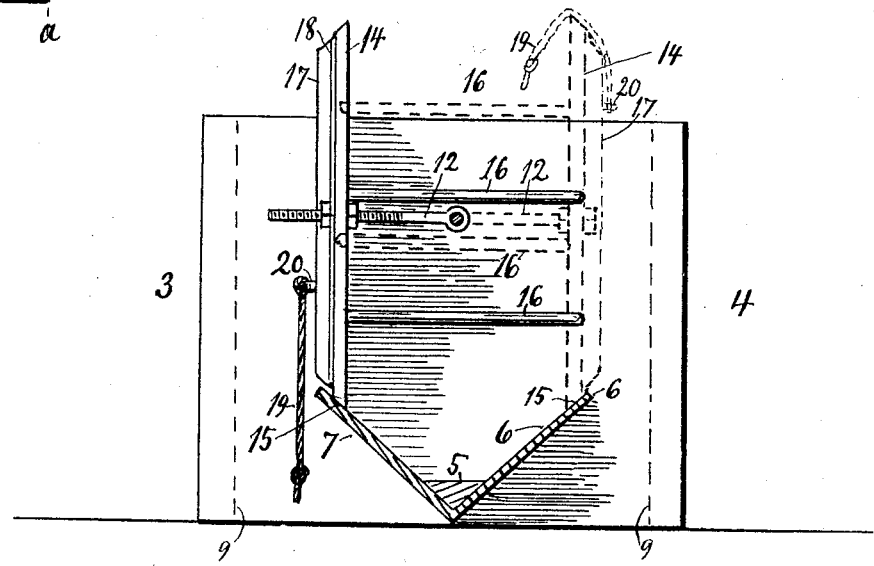

Figure 1 is a top or plan view of my complete feed-trough. Fig. 2 is a left-hand end view of Fig. 1 with the end board 8 removed and the trough proper in section on the line *a a*.

Referring to the drawings by reference-numerals, 1 1 represent the ends of a fence or inclosure for the animals that are to be fed. In such fence is cut an opening 2 2, in which the feeding device is placed in about the position shown, 3 being the outer side and 4 the inner side, occupied by the animals.

5 is the bottom, and 6 we may term the "front" side, and 7 the "rear" side, of the trough proper. The ends of the trough are closed by the large end boards 8 8, which also form the supporting-legs for the trough and serve as end guards to guide the animals into proper position while feeding. Said end boards 8 are preferably strengthened by upright cleats 9 at the ends and a central cleat 10.

About half-way between the ends of the end boards 8 are pivotally secured, preferably by leg-screws 11, two screw-threaded arms 12, having each a pair of nuts 13, between which is thus adjustably secured the longitudinal board 14, which is beveled at its two long edges, so as to fit the inclined sides of the trough, as shown at 15 in Fig. 2, and thus prevent the animals from either raising the fender or working the feed out under it.

In the fender-board 14 are secured vertical rows of horizontal pegs 16, which may be of any desired number, according to the length of the trough, and the distances between the rows and between the last row at each end and the adjacent end boards 8 are such as to admit only one animal in each place and may be regulated according to the size of the animals as the case may be.

17 represents cleats across the fender to strengthen it, especially at the points where the pegs 16 are inserted, where they also help to hold the pegs firmly.

18 represents metallic strips to strengthen the ends of the fender-board and to serve as washers under the nuts 13.

19 is a hand-cord secured by a staple 20 to the fender-board.

The bars or pegs 16 may be flat, with their widest part standing vertically; but I prefer round bars with rounded ends, as they are as cheap to make and have no sharp corners to injure the animals.

In the use of the device the operator standing at the side 3 grasps the rope 19 and pulling upward throws the fender 14 over into the position shown in dotted lines in Fig. 2, so that the hogs or other animals cannot get into the trough while he places the food into it. He then grasps the cord again, finding it in the position shown to the right in Fig. 2, and pulls the fender back to the normal position, in which position it prevents the animals from poking the feed outward over the trough as well as from stepping forward into it, while the pegs 16 prevent them from stepping sidewise into the trough and from tearing the food from each other and fighting over it. If the pigs are young or of a small race, they are still prevented from getting their forefeet into the trough by simply turning the nuts 13, and thereby adjusting the fender toward the middle of the trough. This may cause the fender to get a little lower down and slant some; but there is no harm in that, as it is made high enough to serve its purpose in all positions to which it may be adjusted.

In order to make the fender fit snugly between the end boards 8 both while it is new and after the end boards may have warped, a small space is left between each arm and the end board, so that the fender may be adjusted endwise by turning of the pivot screws or bolts 11, one of them in a tightening and the other in an unscrewing manner.

Having thus described my invention, what I claim, and desire to secure by Letters Patent, is—

1. A feed-trough having end boards projecting above the trough, a plane fender extending normally along one side of the trough to form an upward extension thereof, a pair of arms pivotally secured one to each end board and being secured to the fender at right angles to the same so that the latter may be swung on the pivots to either side of the trough.

2. A feed-trough having end boards projecting above the trough, a fender extending normally along one side of the trough to form an upward extension thereof, a pair of arms pivotally secured one to each end board and being secured to the fender so that the latter may be swung on the pivots to either side of the trough, said fender being adjustable upon the arms to and from the pivoting-points.

3. A feed-trough having end boards projecting above the trough, a fender extending normally along one side of the trough to form an upward extension thereof, a pair of arms pivotally secured one to each end board and being secured to the fender so that the latter may be swung above the pivots to either side of the trough, and be retained in such position by its weight, said trough having an inclined side and said fender having one of its side edges beveled to fit the inner side of the inclined side of the trough, to prevent raising of the fender by the feeding animals.

4. A feed-trough having end boards projecting above the trough, a fender extending normally along one side of the trough to form an upward extension thereof, a pair of arms pivotally secured one to each end board and being secured to the fender so that the latter may be swung on the pivots to either side of the trough, said fender having fixed bars or pegs projecting from it across the trough for the purposes set forth.

5. A feed-trough having end boards projecting above the trough, a fender extending normally along one side of the trough to form an upward extension thereof, a pair of arms pivotally secured one to each end board and being secured to the fender so that the latter may be swung on the pivots to either side of the trough, said fender being adjustable longitudinally by its supporting-pivots.

6. A feed-trough having end boards projecting above the trough, a fender extending normally along one side of the trough to form an upward extension thereof, a pair of arms pivotally secured one to each end board and being secured to the fender so that the latter may be swung on the pivots to either side of the trough, said fender having bars or pegs projecting from it across the trough for the purpose set forth, said bars being cylindrical and having their ends rounded off.

7. A feed-trough having end boards projecting above the trough, a fender extending normally along one side of the trough to form an upward extension thereof, a pair of arms pivotally secured one to each end board and being secured to the fender so that the latter may be swung on the pivots to either side of the trough, said fender having vertical rows of pegs projecting from it across the trough.

8. A feed-trough having end pieces projecting above the trough, a fender extending normally along one side of the trough to form an upward extension thereof, a pair of arms pivotally secured each with one end to one of the end pieces and having their other ends firmly secured to the ends of the fender, said fender having transversely-disposed partition-arms projecting from one side of it above the trough, by which to keep the feeding animals separated, and in a transverse position to the trough.

9. A feed-trough having a fender adapted to form an upward projection along one side of the trough, and pegs or arms fixed in said fender and extending transversely over the trough, for the purpose set forth.

10. A feed-trough having pegs, bars or arms projecting from one side of the trough substantially horizontally toward the opposite side a short distance above the trough, so as to separate the feeding animals.

In testimony whereof I affix my signature in presence of two witnesses.

CURTIS JOHNSON.

Witnesses:
A. M. CARLSEN,
REVILLE CHINWELL.